United States Patent
Park

(10) Patent No.: US 8,528,507 B2
(45) Date of Patent: Sep. 10, 2013

(54) WATER PUMP OF ELECTROMAGNETIC CLUTCH TYPE

(75) Inventor: Youn Taek Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 966 days.

(21) Appl. No.: 12/621,251

(22) Filed: Nov. 18, 2009

(65) Prior Publication Data

US 2011/0005476 A1    Jan. 13, 2011

(30) Foreign Application Priority Data

Jul. 13, 2009 (KR) .................. 10-2009-0063707

(51) Int. Cl.
 *F01P 5/10* (2006.01)
(52) U.S. Cl.
 USPC ........................................ 123/41.44; 192/209
(58) Field of Classification Search
 USPC .............. 123/41.44, 198 C; 192/84.9, 84.94, 192/84.941, 89.23, 89.24, 200, 209, 210, 192/210.1
 See application file for complete search history.

(56) References Cited

U.S. PATENT DOCUMENTS 6,581,743 B2 * 6/2003 Moroi et al. ............... 192/84.81
2005/0178635 A1 * 8/2005 Schultheiss et al. ........... 192/57
2008/0017468 A1 * 1/2008 Krafft et al. .................... 192/40

FOREIGN PATENT DOCUMENTS

JP         09210094 A * 8/1997

* cited by examiner

*Primary Examiner* — Hung Q Nguyen
(74) *Attorney, Agent, or Firm* — Morgan, Lewis & Bockius LLP

(57) ABSTRACT

A water pump of an electromagnetic clutch type, which feeds a coolant with pressure to a water jacket in an engine may include a belt pulley mounted at one end of a bearing shaft for being rotated on the bearing shaft by power transmitted through a belt, an impeller that is fixed to the other end of the bearing shaft, an electromagnetic actuator selectively supplying magnetic force, a clutch operating member movable along the bearing shaft to selectively engage the belt pulley with the bearing shaft by using the magnetic force of the electromagnetic actuator, and an elastic member exerting a force on the clutch operating member to support elastically the clutch operating member toward the belt pulley.

5 Claims, 3 Drawing Sheets

WATER PUMP OF ELECTROMAGNETIC CLUTCH TYPE

CROSS-REFERENCE TO RELATED APPLICATION

The present application claims priority to Korean Patent Application No. 10-2009-63707 filed on Jul. 13, 2009, the entire contents of which are incorporated herein for all purposes by this reference.

BACKGROUND OF THE INVENTION

1. Field of the Invention

The present relates to a water pump of an electromagnetic clutch type, and more particularly to a water pump of electromagnetic clutch type for enhancing energy efficiency.

2. Description of Related Art

Generally, coolant recirculation is performed by a water pump provided to cool an engine in a vehicle.

An impeller disposed inside the water pump is connected to a drive shaft via a drive belt, and the impeller is operated by a shaft being rotated by a pulley.

At this time, the coolant recirculation should be operated only when it is necessary for cooling, substantially in order to reduce a loss of power and to warm up quickly.

Thus, unnecessary operation of the water pump increases consumption of energy, and then more cooling is needed.

In order to avoid the problem, a water pump of an electromagnetic clutch type that is operated according to the temperature of the engine is used.

As shown in FIG. 3, a water pump of an electromagnetic clutch type includes a main clutch 32, an auxiliary clutch 34, an elastic member 38, a belt pulley 30, a clutch lock 33, an electromagnet 35, an auxiliary bearing 36, and a nut (not shown).

The operation of a water pump of an electromagnetic clutch type will hereinafter be described in detail.

Firstly, when a power supply is connected to the electromagnet 35, the auxiliary clutch 34 moves the elastic member 38 in the rightward direction, and then holds the electromagnet 35 not to rotate.

Subsequently, when the auxiliary clutch 34 is fixed, the clutch lock 33 cannot be rotated.

At this time, the auxiliary clutch 34 and the clutch lock 33 are formed to be slot-shaped so as to be moved leftward and rightward and rotate together.

When the clutch lock 33 is fixed, a screw portion 32a on the main clutch 32 and a screw portion 33a on the clutch lock 33 are disengaged by rotation of the belt pulley 30.

Therefore, the main clutch 32 and the belt pulley 30 are separated, and a bearing shaft 20 is not rotated.

However, the belt pulley 30, the main clutch 32, and the auxiliary clutch 34 are seldom separated because a magnetic force of the electromagnet 35 is lower than that of the screw portions 32a and 33a, and thereby an impeller 10 is rotated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a water pump of an electromagnetic clutch type having advantages of enhancing energy efficiency.

In an aspect of the present invention, the water pump of an electromagnetic clutch type, which feeds a coolant with pressure to a water jacket in an engine, may include a belt pulley mounted at one end of a bearing shaft for being rotated on the bearing shaft by power transmitted through a belt, an impeller that is fixed to the other end of the bearing shaft, an electromagnetic actuator selectively supplying magnetic force, a clutch operating member movable along the bearing shaft to selectively engage the belt pulley with the bearing shaft by using the magnetic force of the electromagnetic actuator, and an elastic member exerting a force on the clutch operating member to support elastically the clutch operating member toward the belt pulley.

The water pump may further include an idle pulley bracket disposed inside the belt pulley, wherein the belt pulley is rotatably coupled to the idle pulley bracket, the electromagnetic actuator that is mounted to the idle pulley bracket, a curved portion formed to the belt pulley and extending toward the bearing shaft, and an auxiliary clutch slidably coupled to the bearing shaft and disposed between the curved portion of the belt pulley and the electrometric actuator to contact the curved portion while the auxiliary clutch is pressed by the clutch operating member activated by the magnetic force of the electrometric actuator.

The auxiliary clutch may include a protrusion disposed between one end portion of the clutch operating member and one surface of the auxiliary clutch, wherein the clutch operating member is provided with a snug groove so that the auxiliary clutch is fitted therein, an exterior surface of a concave groove formed in the clutch operating member contacts the elastic member, and the auxiliary clutch is disposed in the concave groove.

The water pump may further include a main clutch fixed to the one end of the bearing shaft and selectively contacting the curved portion of the belt pulley and a clutch lock interposed between the auxiliary clutch and the bearing shaft and engaged with the main clutch, wherein the curved portion of the belt pulley is slidably mounted between the main clutch and the clutch lock and the auxiliary clutch is slidably engaged with the clutch lock, wherein the main clutch is provided with a through hole formed at a center thereof, a surface of a flange selectively contacting the curved portion of the belt pulley, and a screw portion is formed at an exterior circumference of the through hole such that the main clutch is rotated together with the bearing shaft, and the clutch lock is provided with a screw portion formed at an interior circumference thereof so as to correspond to a screw portion of the main clutch.

The auxiliary clutch may be disengaged from the belt pulley and at the same time rotation of the auxiliary clutch is prevented, and thereby the screw portion of the main clutch and the screw portion of the clutch lock are disengaged while the clutch operating member exerts a force on the auxiliary clutch by using an attractive magnetic force generated from the electromagnetic actuator in a case that electricity is supplied to the electromagnetic actuator, and the auxiliary clutch may contact the belt pulley and at the same time the screw portion of the main clutch and the screw portion of the clutch lock are engaged with each other in order to transmit a rotating force of the belt pulley to the impeller while the elastic member is restored in a case that electricity is supplied to the electromagnet.

The methods and apparatuses of the present invention have other features and advantages which will be apparent from or are set forth in more detail in the accompanying drawings, which are incorporated herein, and the following Detailed

Figure 1:
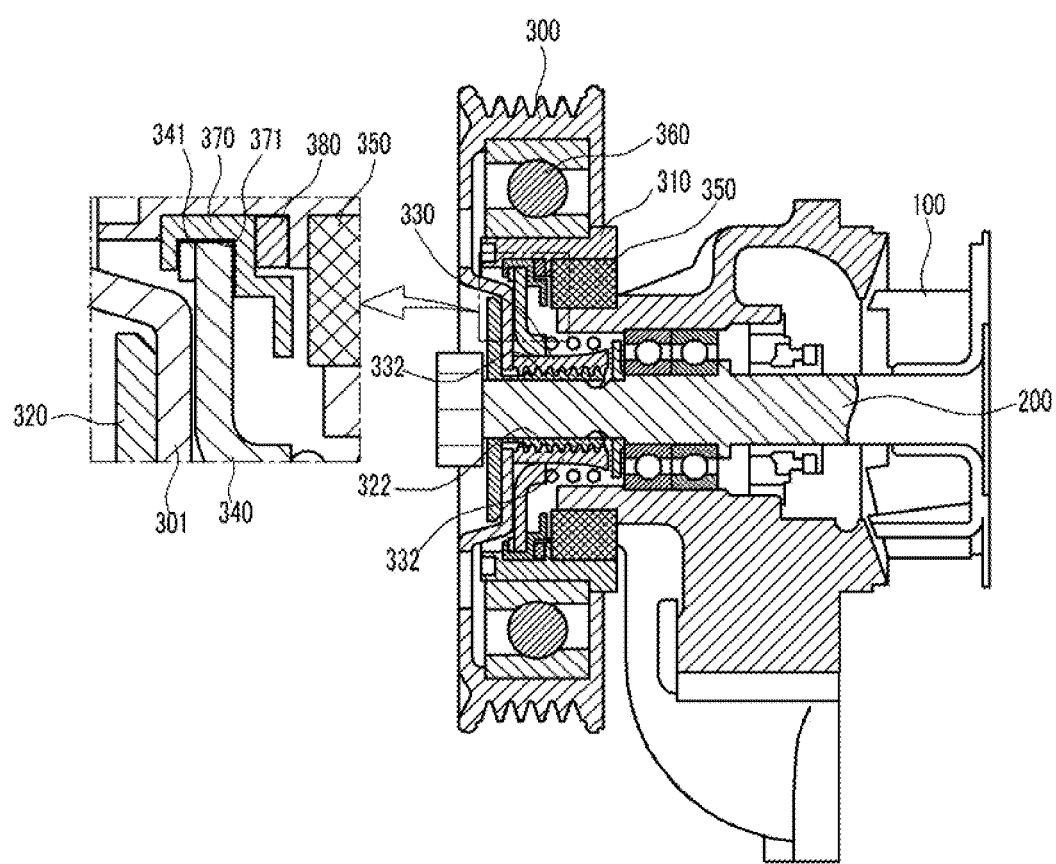
FIG. 1 is a cross-sectional view of a water pump of an electromagnetic clutch type applied to an engine according to an exemplary embodiment of the present invention under a low temperature.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
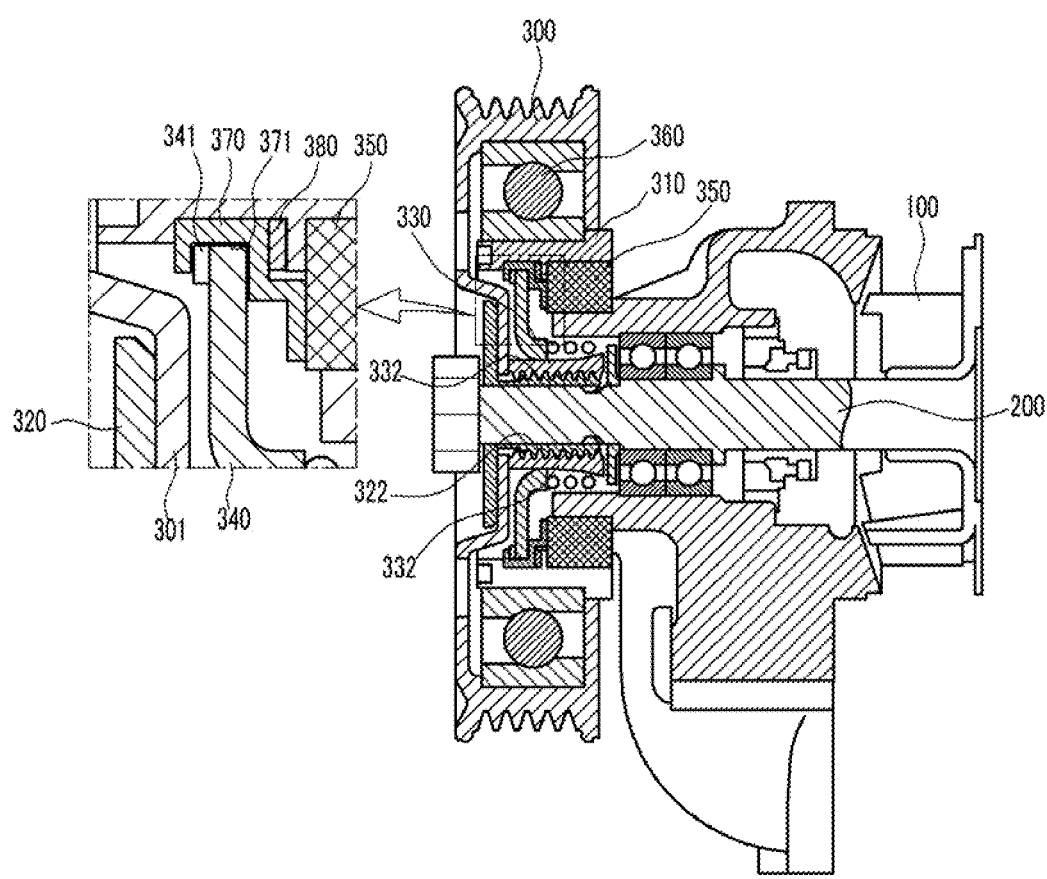
FIG. 2 is a cross-sectional view of a water pump of an electromagnetic clutch type applied to an engine according to an exemplary embodiment of the present invention under a high temperature.
Figure 3:
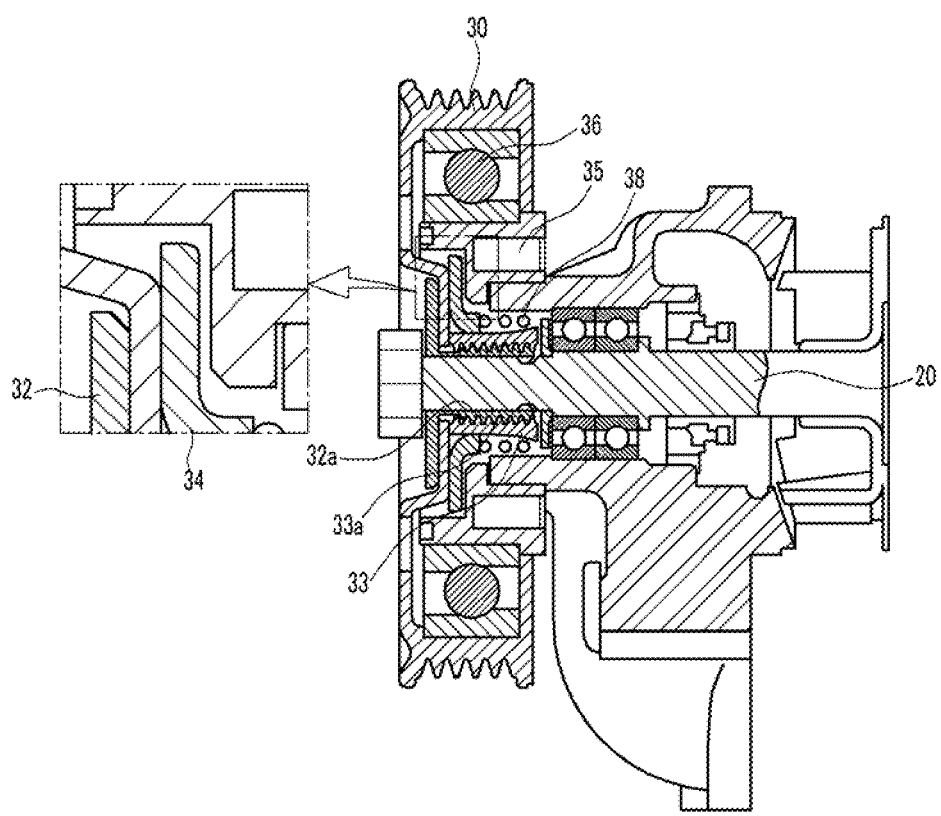
FIG. 3 is a cross-sectional view of a conventional water pump of an electromagnetic clutch type.

FIG. 1 is a cross-sectional view of a water pump of an electromagnetic clutch type applied to an engine according to an exemplary embodiment of the present invention under a low temperature, and FIG. 2 is a cross-sectional view of a water pump of an electromagnetic clutch type applied to an engine according to an exemplary embodiment of the present invention under a high temperature.

As shown in FIG. 1 and FIG. 2, a water pump of an electromagnetic clutch type feeding pressurized coolant cooled by a radiator (not shown) to a water jacket (not shown) in an engine includes a belt pulley 300 disposed at an end of a bearing shaft 200 that is rotated by power transmitted from a crankshaft (not shown) through a belt (not shown), and an impeller 100 disposed at the other end thereof.

Herein, the belt pulley 300 includes an idle pulley bracket 310, a main clutch 320, a clutch lock 330, an auxiliary clutch 340, and an electromagnet 350 therein.

The electromagnet 350 may be disposed at a space defined in the idle pulley bracket 310.

In addition, an auxiliary bearing 360 is interposed between the belt pulley 300 and the idle pulley bracket 310 in order to prevent transmission of rotating force to the bearing shaft 200.

Further, a curved portion 301 is formed near a center of the belt pulley 300 toward the inside thereof.

A through hole (not shown) is formed at an axial center of the main clutch 320.

A surface of a flange selectively contacting the curved portion 301 is formed at an end of the through hole of the main clutch 320 in a diameter direction.

Further, a screw portion 322 is formed at an exterior circumference of the through hole.

Herein, the main clutch 320 is rotated together with the bearing shaft 200, and is connected thereto so as to be moved in an axial direction.

A nut (not shown) may be formed at an end of the bearing shaft 200 in order to prevent the main clutch 320 from disassembling from the bearing shaft 200.

A clutch lock 330 having a screw portion 322 at an interior circumference thereof so as to correspond to the screw portion 332 of the main clutch 320 is disposed at an exterior circumference of the main clutch 320.

The auxiliary clutch 340 is engaged with the clutch lock 330 through a slot-shaped surface and is fixed to the clutch lock 330 with respect to a rotating direction, while the auxiliary clutch 340 is disposed such that it can be moved in the axial direction.

The auxiliary clutch 340 is formed so as to contact the curved portion 301 of the belt pulley 300.

Further, a protrusion 341 is formed at an opposite end of the auxiliary clutch 340 with respect to the impeller 100.

The protrusion 341 is fixed snugly with an end portion of the auxiliary clutch 340 in a concave groove 371 of a clutch operating member 370.

That is, an end portion of the auxiliary clutch 340 and the protrusion 341 is mounted snugly at the concave groove 371.

Further, an elastic member 380 is disposed at an opposite surface of the auxiliary clutch 340.

The elastic member 380 supports the auxiliary clutch 340 so as to exert a force on the auxiliary clutch 340 toward the belt pulley 300.

An end portion of the clutch operating member 370 extends therefrom so as to face the electromagnet 350, and receives a magnetic force when power is supplied to the electromagnet 350.

Operation of the water pump of an electromagnetic clutch type according to an exemplary embodiment of the present invention will hereinafter be described in detail.

Firstly, power is supplied to the electromagnet 350 at start-up of an engine in case of a cold engine.

At this point, the clutch operating member 370 is moved to the electromagnet 350 by the magnetic force.

Subsequently, the clutch operating member 370 compresses the elastic member 380 and exerts a force on the protrusion 341 of the auxiliary clutch 340 so as to exceed an elastic force of the elastic member.

The auxiliary clutch 340 is thereby prevented from rotating, so the clutch lock 330 cannot be rotated.

Therefore, the screw portion 332 of the clutch lock 330 and the screw portion 322 of the main clutch 320 are disengaged.

Further, rotation of the impeller 100 is stopped, and the belt pulley 300 keeps rotating.

Meanwhile, power supply to the electromagnet 350 is disconnected in case of a hot engine.

At the same time, the elastic member 380 is restored so that the clutch operating member 370 is restored.

The auxiliary clutch 340 that was moved by the clutch operating member 370 then moves toward an expanding direction of the elastic member 380.

Further, the auxiliary clutch 340 contacts the belt pulley 300, and thereby the auxiliary clutch 340 and the belt pulley 300 are rotated together.

The auxiliary clutch 340 transmits a rotating force of the belt pulley 300 to the clutch lock 330, and then the impeller 100 is operated through the bearing shaft 200.

For convenience in explanation and accurate definition in the appended claims, the term "exterior" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A water pump of an electromagnetic clutch type, which feeds a coolant with pressure to a water jacket in an engine, comprising:
    a belt pulley mounted at one end of a bearing shaft for being rotated on the bearing shaft by power transmitted through a belt;
    an impeller that is fixed to the other end of the bearing shaft;
    an electromagnetic actuator selectively supplying magnetic force;
    a clutch operating member movable along the bearing shaft to selectively engage the belt pulley with the bearing shaft by using the magnetic force of the electromagnetic actuator;
    an elastic member exerting a force on the clutch operating member to support elastically the clutch operating member toward the belt pulley;
    an idle pulley bracket disposed inside the belt pulley, wherein the belt pulley is rotatably coupled to the idle pulley bracket;
    the electromagnetic actuator that is mounted to the idle pulley bracket;
    a curved portion formed to the belt pulley and extending toward the bearing shaft; and
    an auxiliary clutch slidably coupled to the bearing shaft and disposed between the curved portion of the belt pulley and the electromagnetic actuator to contact the curved portion while the auxiliary clutch is pressed by the clutch operating member activated by the magnetic force of the electromagnetic actuator;
    wherein the auxiliary clutch includes a protrusion disposed between one end portion of the clutch operating member and one surface of the auxiliary clutch.

2. The water pump of claim 1, wherein the clutch operating member is provided with a snug groove so that the auxiliary clutch is fitted therein, an exterior surface of a concave groove formed in the clutch operating member contacts the elastic member, and the auxiliary clutch is disposed in the concave groove.

3. The water pump of claim 1, further comprising:
    a main clutch fixed to the one end of the bearing shaft and selectively contacting the curved portion of the belt pulley, and
    a clutch lock interposed between the auxiliary clutch and the bearing shaft and engaged with the main clutch, wherein the curved portion of the belt pulley is slidably mounted between the main clutch and the clutch lock and the auxiliary clutch is slidably engaged with the clutch lock.

4. The water pump of claim 3, wherein
    the main clutch is provided with a through hole formed at a center thereof, a surface of a flange selectively contacting the curved portion of the belt pulley, and a screw portion is formed at an exterior circumference of the through hole such that the main clutch is rotated together with the bearing shaft; and
    the clutch lock is provided with a screw portion formed at an interior circumference thereof so as to correspond to the screw portion of the main clutch.

5. The water pump of claim 4, wherein the auxiliary clutch is disengaged from the belt pulley and at the same time rotation of the auxiliary clutch is prevented, and thereby the screw portion of the main clutch and the screw portion of the clutch lock are disengaged while the clutch operating member exerts a force on the auxiliary clutch by using an attractive magnetic force generated from the electromagnetic actuator in a case that electricity is not supplied to the electromagnetic actuator, and
    the auxiliary clutch contacts the belt pulley and at the same time the screw portion of the main clutch and the screw portion of the clutch lock are engaged with each other in order to transmit a rotating force of the belt pulley to the impeller while the elastic member is restored in a case that electricity is supplied to the electromagnet.

* * * * *